Patented Nov. 4, 1924.

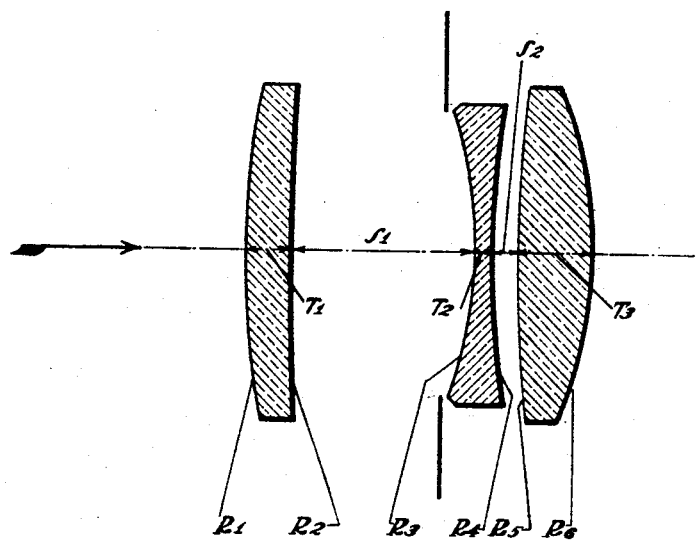

1,514,356

UNITED STATES PATENT OFFICE.

ARTHUR WARMISHAM, OF LEICESTER, ENGLAND.

LENS.

Application filed August 7, 1920. Serial No. 401,862.

*To all whom it may concern:*

Be it known that I, ARTHUR WARMISHAM, M. Sc., a British subject, of Stoughton Street Works, Leicester, in the county of Leicester, England, have invented certain new and useful Improvements in Lenses, of which the following is a specification.

This invention relates to a lens for photographic purposes, of the Cooke type, i. e., a lens which consists of three members separated by air spaces, the middle member being a simple negative or divergent lens, and the front and back members both being simple positive or convergent lenses.

The primary object of the invention is to provide a cheaper construction of such lenses without sacrifice of quality, and I achieve this by the use of a glass of low refractive index for one of the positive lenses in a particular and novel combination of constructional elements.

Throughout this specification I employ the term "positive lens" to describe a convergent lens, and the term "negative lens" to describe a divergent lens.

The terms "focal length" and "power" referring to a simple lens are used in this specification in the usual approximate sense defined by the equations:—

$$\text{Power} = \frac{1}{\text{focal length}} = (n_D - 1)\left(\frac{1}{r_1} - \frac{1}{r_2}\right)$$

where $r_1$ and $r_2$ are the radii of curvature of the first and second surfaces of the lens and $n_D$ the refractive index of the material; that is to say, in assessing the two quantities, power and focal length, of an element of my construction, I adopt the convention of ignoring the thickness of the element.

We have discovered that good definition over an angular field 60 degrees in extent can be obtained from a three separate component lens using shallow curves under the following conditions:—

1. The refractive index for sodium light of the glass of the negative lens is to lie substantially between the limits 1.542 and 1.576.

2. The negative lens must be unsymmetrically double concave, and it must present its face of deeper curvature (i. e. shorter radius) towards the incident light.

3. The positive lenses must be decidedly different from one another in focal length in order to secure a short overall length of the combination. I find that the best results require that the focal length of the weaker positive lens should differ from the equivalent focal length of the combination by not more than 18%.

4. The refractive index for sodium light of the glass of the stronger positive lens should not be less than 1.57.

5. The stronger positive lens must be unsymmetrically double convex; it must lie behind the negative lens viewed from the direction of the incident light, and must present its face of longer radius towards the negative lens. The air space separating the stronger positive lens from the negative must not exceed 2½% of the equivalent focal length of the combination, and it must have the shape of a positive meniscus lens.

6. The weaker positive lens must be meniscus shaped; it must present its convex side towards the incident light, and its concave side towards the negative; and it must lie in front of the negative lens as viewed from the direction of the incident light. The air space separating the weaker positive lens from the negative must be substantially greater than 5% of the equivalent focal length of the combination, and it must have the shape of a double convex lens.

The state of the art so far as my invention is concerned is duly set out in the following British specifications, viz:—Nos. 22,157 of 1910; 3,399 of 1911, and 6,328 of 1913.

In specification No. 3,399 of 1911 it is proposed to use a sequence of refractive indices similar to mine, in combination with three lenses all of relatively long focal length, the most powerful lens (the negative) having a focal length of not less than $\frac{3}{10}$ths. of the focal length of the complete combination. In my invention, however, the focal length of the most powerful lens (the negative) is substantially less than $\frac{3}{10}$ths. of the focal length of the complete combination.

It has further been proposed in specification 22,157 of 1910 to modify a four lens system so as to produce a three lens system with a sequence of refractive indices similar to mine, the positive member of low refractive index being of double convex form. In my invention, however, the positive member of low refractive index is of meniscus form.

Again, it has been proposed in specification No. 6328 of 1913 to limit definitely the front air space so that it does not exceed 1½% of the focal length of the complete system. My invention, however, demands totally different limitations of both front and back air spaces, as already set out.

A numerical example of this improved construction will now be described:—

The radii of the successive surfaces are numbered $R_1$, $R_2$ and so on counting from the front as shown in the figure.

The sign-convention adopted here is, that + attached to a radius means that the corresponding surface is convex towards the incident light, and — attached to it means that it is concave towards the incident light.

The glasses are specified by the refractive index for sodium light, $n_D$, and the nu-value.

The thicknesses of the three lenses are denoted by $T_1$, $T_2$ and $T_3$, and the air spaces by $S_1$ and $S_2$ as shewn in Figure 1.

All the linear dimensions are in inches.

*Equivalent focal length 10″*      *Relative aperture F/7.7*

|  |  |  | $n_D$ | nu-value. | Type Nos. of glass in Chance' Catalogue. |
|---|---|---|---|---|---|
| $R_1+ 3.862$<br>$R_2+13.74$ | $T_1$ | .177 | 1.5149 | 58.0 | 1066. |
|  | $S_1$ | .75 |  |  |  |
| $R_3- 1.699$<br>$R_4+ 4.044$ | $T_2$ | .066 | 1.5534 | 46.1 | 7983. |
|  | $S_2$ | .110 |  |  |  |
| $R_5+ 7.170$<br>$R_6- 1.768$ | $T_3$ | .290 | 1.6100 | 59.0 | 4873. |

Diaphragm to be .15 in front of the vertex of $R_3$. Power of strongest lens (the negative)

$$= .5534 \times \left(\frac{-1}{1.699} \quad \frac{-1}{4.044}\right)$$
$$= -.4625$$

Focal length= $-2.162=21.6\%$ of focal length of combination.

Power of weaker positive lens (the front)

$$= .5149 \times \left(\frac{1}{3.862} \quad \frac{-1}{13.74}\right)$$
$$= .0958$$

Focal length=10.44=4.4% different from focal length of combination.

It is seen that the deepest curve in this example of my construction is of radius 1.699″. The corresponding curve of the Cooke series V lens of the same relative aperture F/7.7 described in British specification No. 15107 of 1895, is of radius 1.327″. As the diameters are the same this shows that I employ substantially shallower curves, and that therefore my combination is cheaper for manufacturing purposes.

I claim:—

1. An anastigmatic photographic lens of the type consisting of a negative lens enclosed between two positive lenses and separated from them by air spaces, in which the front positive lens is made of glass of refractive index not exceeding 1.535 and is meniscus shaped, presenting its convex side toward the incident light.

2. An anastigmatic photographic lens of the type consisting of a negative lens enclosed between two positive lenses and separated from them by air spaces, in which one of the positive lenses is made of glass of low refractive index and is meniscus shaped, presenting its convex side outward, and has a focal length differing from the equivalent focal length of the combination by not more than 18%.

3. An anastigmatic photographic lens of the type consisting of a negative lens enclosed between two positive lenses and separated from them by air spaces, in which one of the positive lenses is made of glass of low refractive index, is meniscus shaped, presenting its convex side outward, and has a focal length differing from the equivalent focal length of the combination by not more than 18%, and in which the negative lens is made of glass of refractive index between about 1.542 and 1.576 and has a focal length less than 30% of the equivalent focal length of the combination.

4. An anastigmatic photographic lens of the type consisting of a negative lens enclosed between two positive lenses and separated from them by air spaces, in which the front positive lens is made of glass of refractive index not exceeding 1.535 and is meniscus shaped, presenting its convex side toward the incident light, and in which the negative lens is made of glass of refractive index between about 1.542 and 1.576 and has a focal length equal to about one-fifth of the focal length of the combination.

5. An anastigmatic photographic lens of the type consisting of a negative lens enclosed between two positive lenses and separated from them by air spaces, in which one of the positive lenses is made of glass of low refractive index, is meniscus shaped, presenting its convex side outward, and has a focal length differing from the equivalent focal length of the combination by not more than 18%, in which the negative lens is made of glass of refractive index between about 1.542 and 1.576 and has a focal length less than 30% of the equivalent focal length of the combination, and in which the other positive lens is made of glass of refractive index not less than 1.57.

6. An anastigmatic photographic lens of the type consisting of a negative lens enclosed between two positive lenses and separated from them by air spaces in which one of the positive lenses is made of glass of low refractive index, is meniscus shaped, having the radius of its concave side not exceeding twice the equivalent focal length of the combination, and presenting its convex side outward, and has a focal length differing from the equivalent focal length of the combination by not more than 18%, in which the negative lens is made of glass of refractive index between about 1.542 and 1.576, and has a focal length less than 30% of the equivalent focal length of the combination, and in which the other positive lens is made of glass of refractive index not less than 1.57.

7. An anastigmatic photographic lens of the type consisting of a negative lens enclosed between two positive lenses and separated from them by air spaces, in which the front positive lens is made of glass of refractive index not exceeding 1.535, is meniscus shaped, presenting its convex side toward the incident light, and has a focal length differing from the equivalent focal length of the combination by not more than 18%, and in which the back air space does not exceed 2½% of the equivalent focal length of the combination.

8. An anastigmatic photographic lens of the type consisting of a negative lens enclosed between two positive lenses and separated from them by air spaces, in which one of the positive lenses is made of glass of low refractive index, is meniscus shaped, presenting its convex side outward, and has a focal length differing from the equivalent focal length of the combination by not more than 18%, and in which the air space between the meniscus lens and the negative lens exceeds 5% of the equivalent focal length of the combination while the air space between the other positive lens and the negative lens does not exceed 2½% of the equivalent focal length of the combination.

9. An anastigmatic photographic lens of the type consisting of a negative lens enclosed between two positive lenses and separated from them by air spaces in which the front positive lens is made of glass of low refractive index, is meniscus shaped, presenting its convex side toward the incident light, and which has a focal length differing from the equivalent focal length of the combination by not more than 18%, in which the negative lens has a focal length less than 30% of the equivalent focal length of the combination, and in which the back air space does not exceed 2½% of the equivalent focal length of the combination.

10. An anastigmatic photographic lens of the type consisting of a negative lens enclosed between two positive lenses and separated from them by air spaces, in which the front positive lens is made of glass of refractive index not exceeding 1.535, is meniscus shaped, presenting its convex side toward the incident light, and has a focal length differing from the equivalent focal length of the combination by not more than 18%, and in which the back air space does not exceed 2½% of the equivalent focal length of the combination while the front air space exceeds 5% of the equivalent focal length of the combination.

11. An anastigmatic photographic lens of the type consisting of a negative lens enclosed between two positive lenses and separated from them by air spaces in which the front positive lens is made of glass of refractive index not exceeding 1.535, is meniscus shaped, presenting its convex side toward the incident light, and has a focal length differing from the equivalent focal length of the combination by not more than 18%, in which the negative lens is made of glass of refractive index between about 1.542 and 1.576, has a focal length materially less than 30% of the equivalent focal length of the combination and is unsymmetrically double concave with its deeper side toward the incident light, and in which the back positive lens is made of glass of refractive index not less than 1.57, and is unsymmetrically double convex with its shallower side toward the incident light.

12. An anastigmatic photographic lens of the type consisting of a negative lens enclosed between two positive lenses and separated from them by air spaces, in which the front positive lens is made of glass of refractive index not exceeding 1.535, is meniscus shaped, presenting its convex side toward the incident light, and has a focal length differing from the equivalent focal length of the combination by not more than 18%, in which the negative lens is made of glass of refractive index between 1.542 and 1.576, has a focal length materially less than 30% of the equivalent focal length of the combination, and is unsymmetrically double concave with its deeper side toward the incident light; in which the back positive lens is made of glass of refractive index not less than 1.57, and is unsymmetrically double convex with its shallower side toward the incident light, and in which the back space does not exceed 2½% of the equivalent focal length of the combination, while the front air space exceeds 5% of the equivalent focal length of the combination.

13. An anastigmatic photographic lens of the type consisting of a negative lens enclosed between two positive lenses and separated from them by air spaces in which the front positive lens is made of glass of refractive index not exceeding 1.535, is meniscus shaped, presenting its convex side toward the incident light, has the radius of its concave side not exceeding twice the equivalent focal length of the combination, and has a focal length differing from the equivalent focal length of the combination by not more than 18%, in which the negative lens is made of glass of refractive index between about 1.542 and 1.576, has a focal length equal to about one-fifth of the focal length of the combination, and is unsymmetrically double concave with its deeper side toward the incident light, in which the back air space does not exceed 2½% of the equivalent focal length of the combination, in which the front air space exceeds 5% of the equivalent focal length of the combination, and in which the back positive lens is made of glass of refractive index about 1.61 and is unsymmetrically double convex with its shallower side toward the incident light.

14. An anastigmatic photographic lens of the type consisting of a negative lens enclosed between two positive lenses and separated from them by air spaces, in which the front positive lens is made of glass of low refractive index and is meniscus shaped, having the radius of its concave side not exceeding twice the equivalent focal length of the combination and presenting its convex side toward the incident light, and in which the air space between the front positive lens and the negative lens is materially greater than the air space between the back positive lens and the negative lens.

ARTHUR WARMISHAM.